June 25, 1968     E. H. EASTIN     3,389,922
AMUSEMENT AND SPORTING DEVICE
Filed Oct. 22, 1965     14 Sheets-Sheet 1

INVENTOR.
EDWARD H. EASTIN
BY
Barnes, Kisselle, Raisch & Choate
ATTYS.

June 25, 1968  E. H. EASTIN  3,389,922
AMUSEMENT AND SPORTING DEVICE
Filed Oct. 22, 1965  14 Sheets-Sheet 2

INVENTOR.
EDWARD H. EASTIN
BY
Barnes, Kiesselle Laich & Choate
ATTYS.

INVENTOR.
EDWARD H. EASTIN

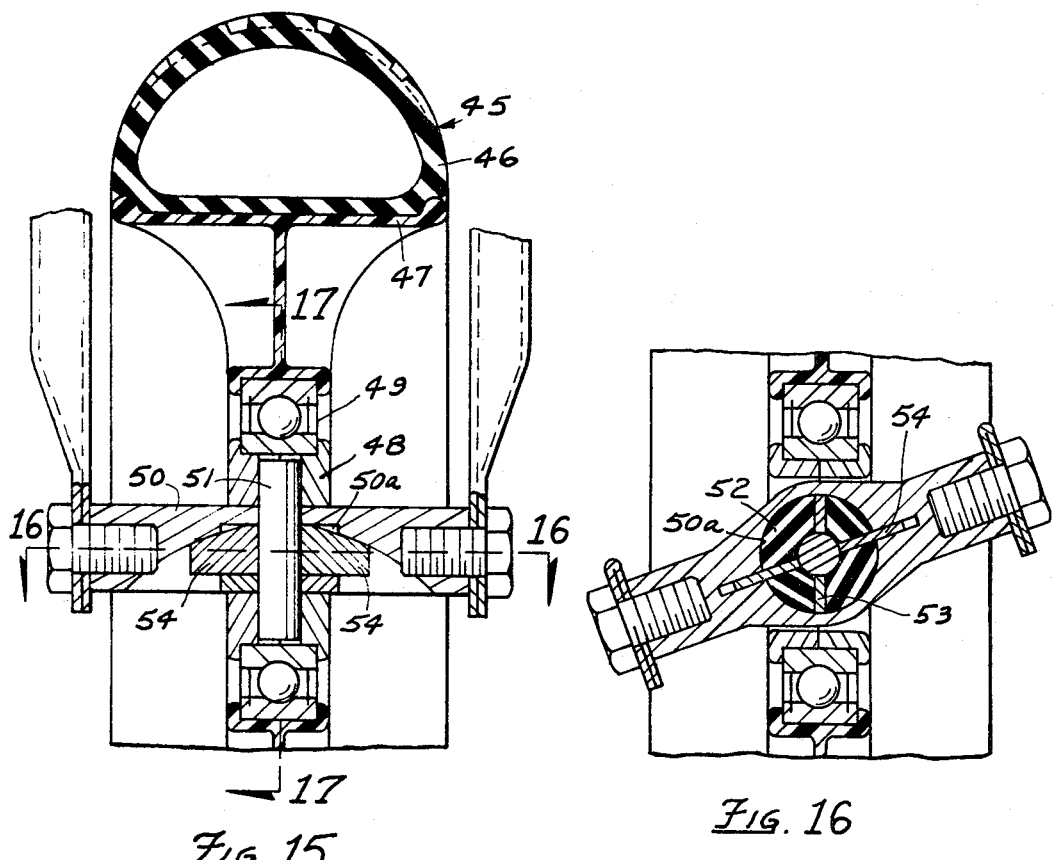
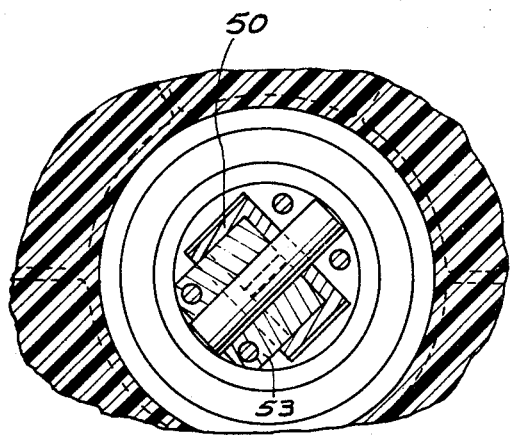

June 25, 1968　　　　　E. H. EASTIN　　　　　3,389,922
AMUSEMENT AND SPORTING DEVICE
Filed Oct. 22, 1965　　　　　　　　　　　　　　14 Sheets-Sheet 5

INVENTOR.
EDWARD H. EASTIN
BY
Barnes, Kisselle, Raisch & Choate
ATTYS.

June 25, 1968 E. H. EASTIN 3,389,922
AMUSEMENT AND SPORTING DEVICE
Filed Oct. 22, 1965 14 Sheets-Sheet 6
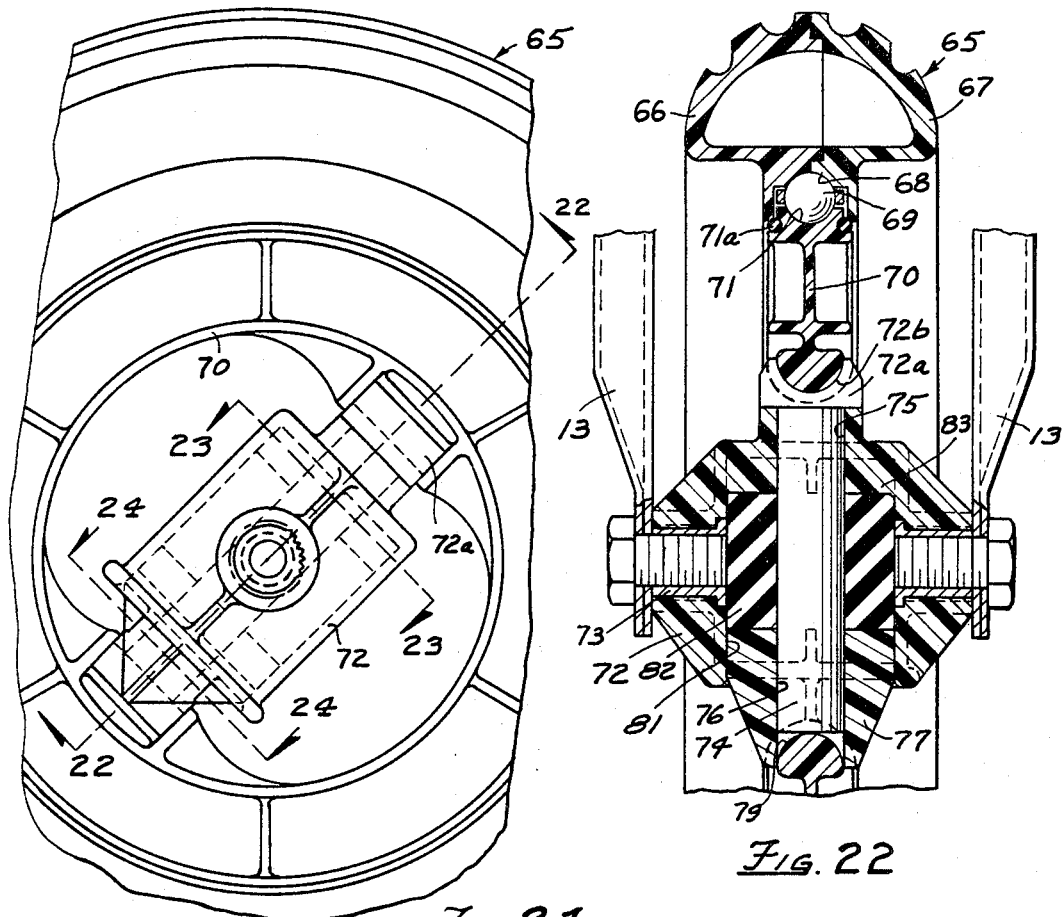
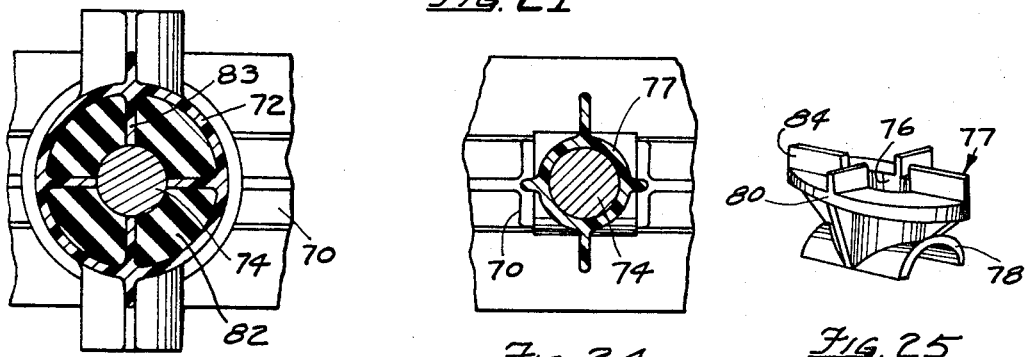
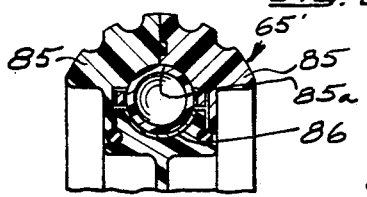
INVENTOR.
EDWARD H. EASTIN
BY
ATTYS.

June 25, 1968 E. H. EASTIN 3,389,922
AMUSEMENT AND SPORTING DEVICE
Filed Oct. 22, 1965 14 Sheets-Sheet 7

INVENTOR.
EDWARD H. EASTIN
BY
Barnes, Kisselle, Raisch & Choate
ATTYS.

June 25, 1968 E. H. EASTIN 3,389,922
AMUSEMENT AND SPORTING DEVICE
Filed Oct. 22, 1965 14 Sheets-Sheet 8
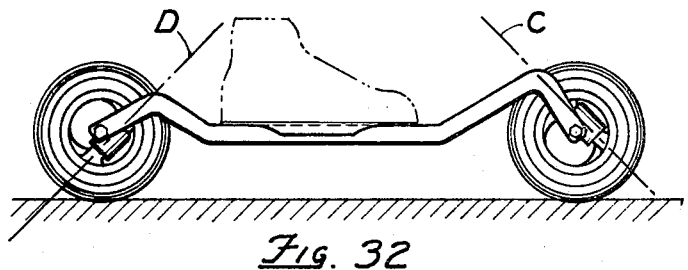
Fig. 32
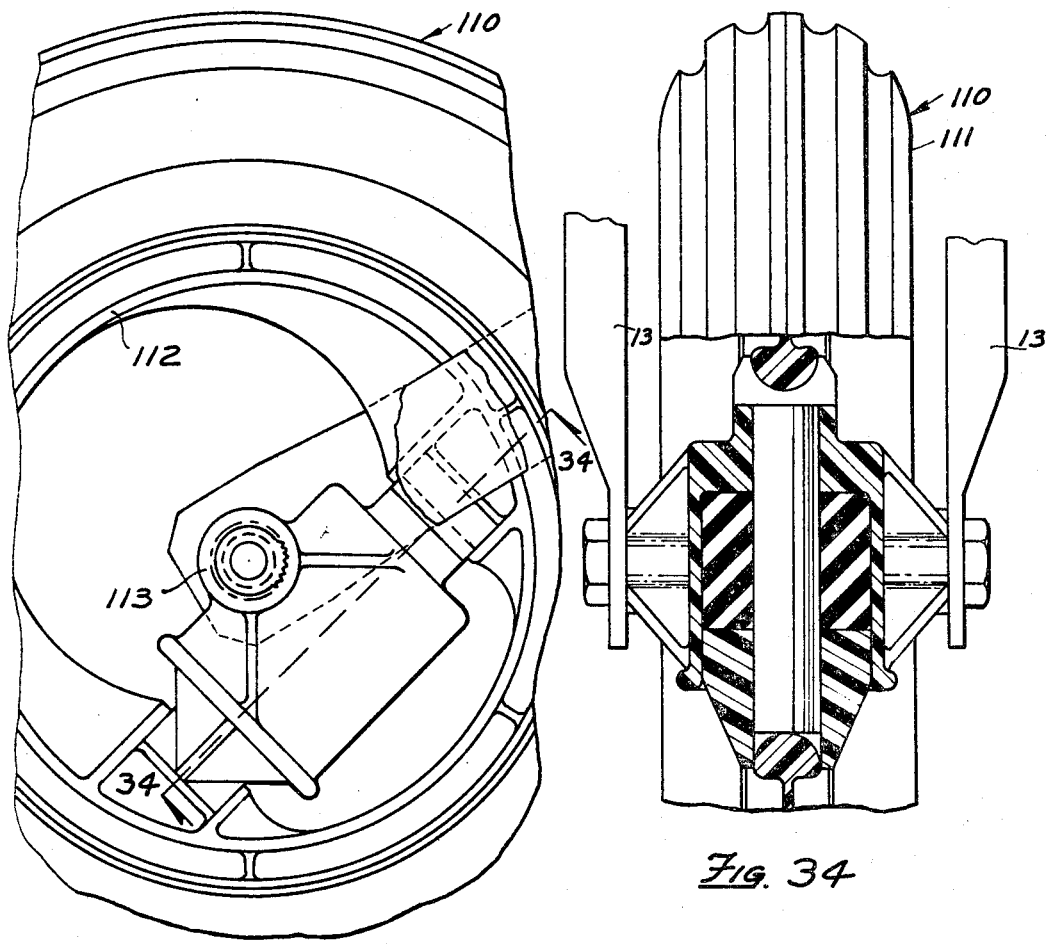
Fig. 33
Fig. 34
INVENTOR.
EDWARD H. EASTIN
BY
Barnes, Kisselle, Raisch & Choate
ATTYS.

June 25, 1968     E. H. EASTIN     3,389,922
AMUSEMENT AND SPORTING DEVICE
Filed Oct. 22, 1965     14 Sheets-Sheet 9
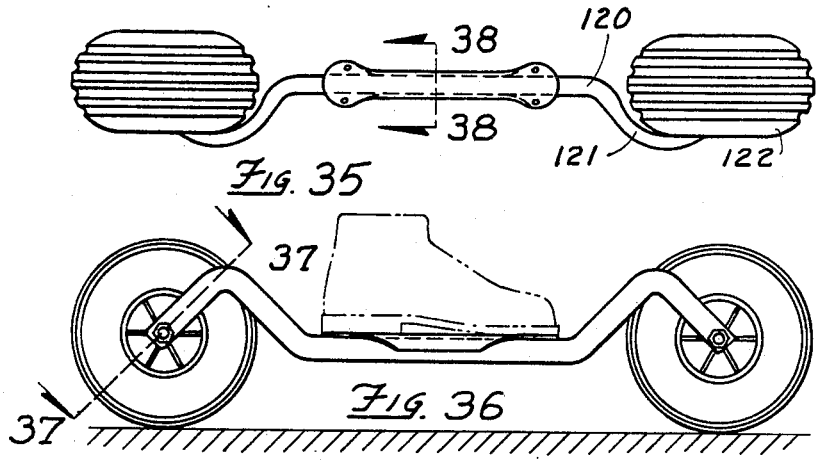
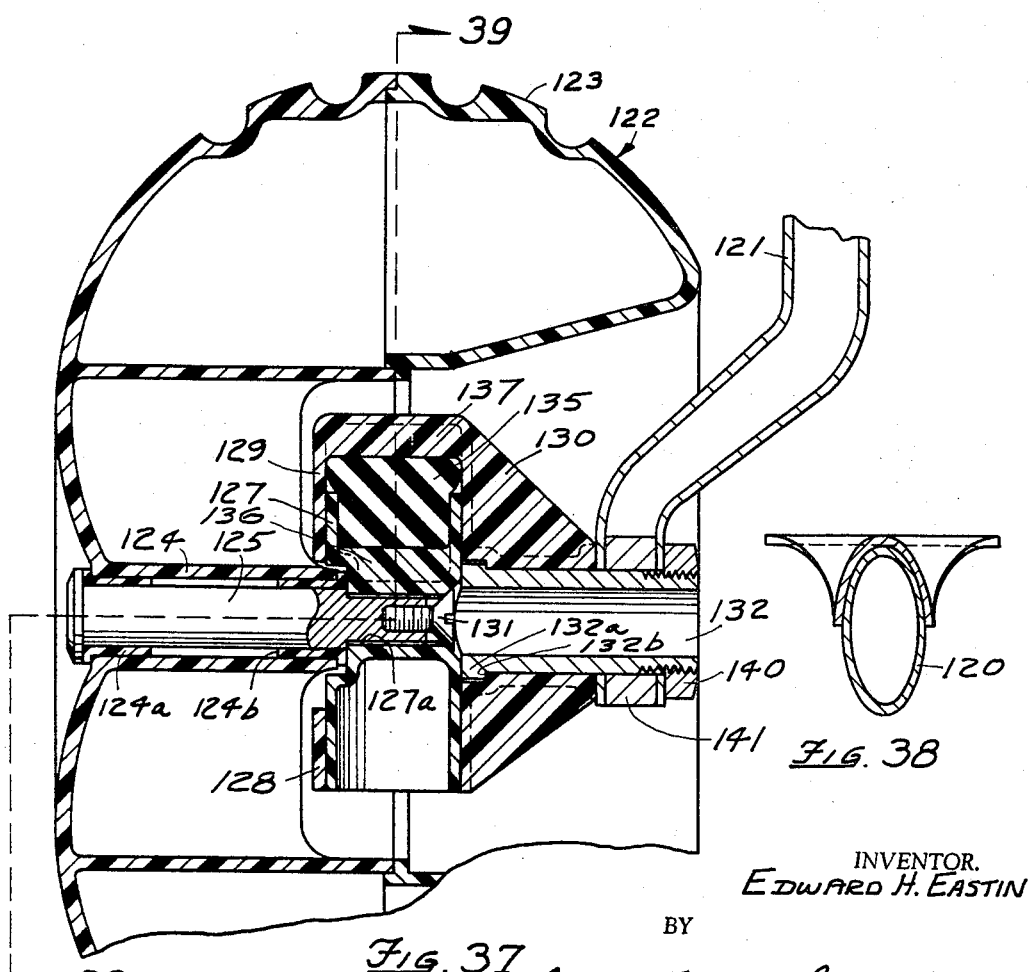
INVENTOR.
EDWARD H. EASTIN
BY
Barnes, Kisselle, Raisch & Choate
ATTYS.

June 25, 1968      E. H. EASTIN      3,389,922

AMUSEMENT AND SPORTING DEVICE

Filed Oct. 22, 1965      14 Sheets-Sheet 10

INVENTOR.
EDWARD H. EASTIN
BY
Barnes, Kisselle, Raisch & Choate
ATTYS.

June 25, 1968  E. H. EASTIN  3,389,922
AMUSEMENT AND SPORTING DEVICE
Filed Oct. 22, 1965  14 Sheets-Sheet 11

INVENTOR.
EDWARD H. EASTIN
BY
Barnes, Kisselle, Raisch & Choate
ATTYS.

June 25, 1968  E. H. EASTIN  3,389,922
AMUSEMENT AND SPORTING DEVICE
Filed Oct. 22, 1965  14 Sheets-Sheet 12
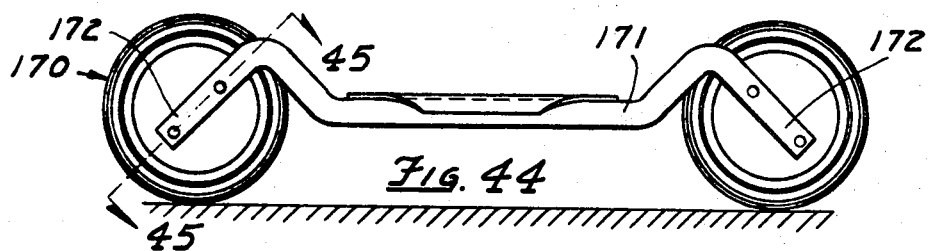
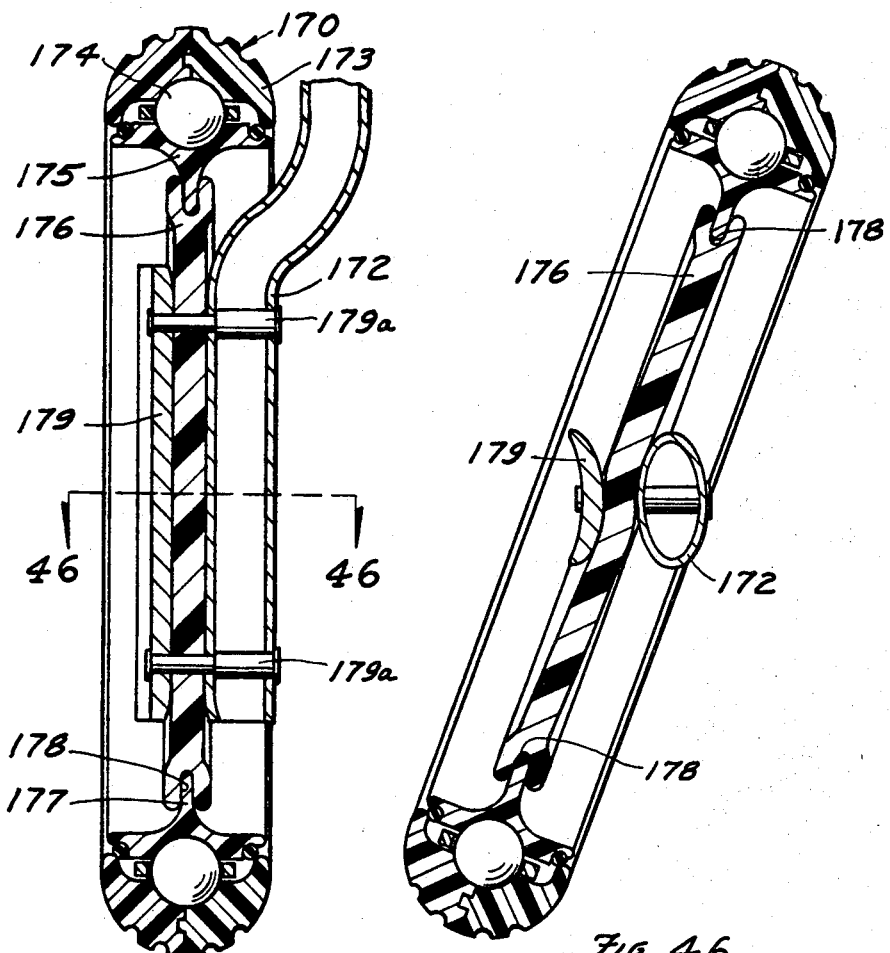
INVENTOR.
EDWARD H. EASTIN
BY
ATTYS.

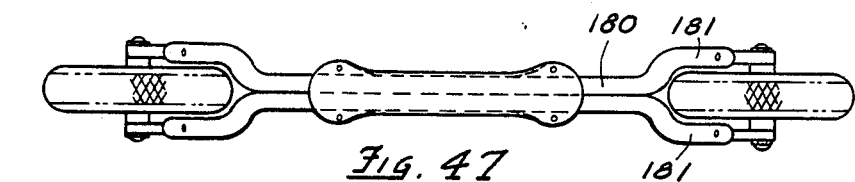
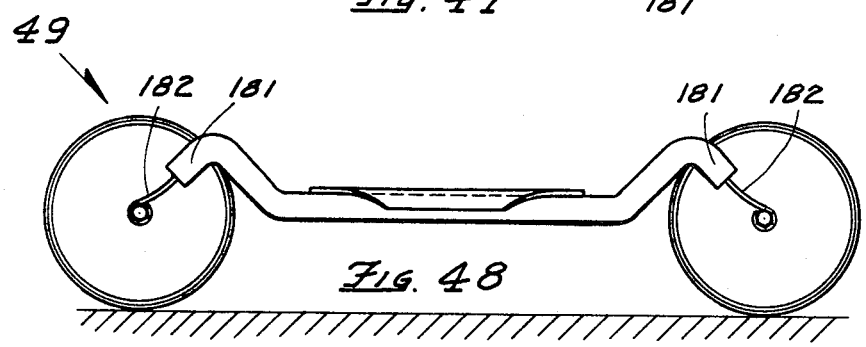
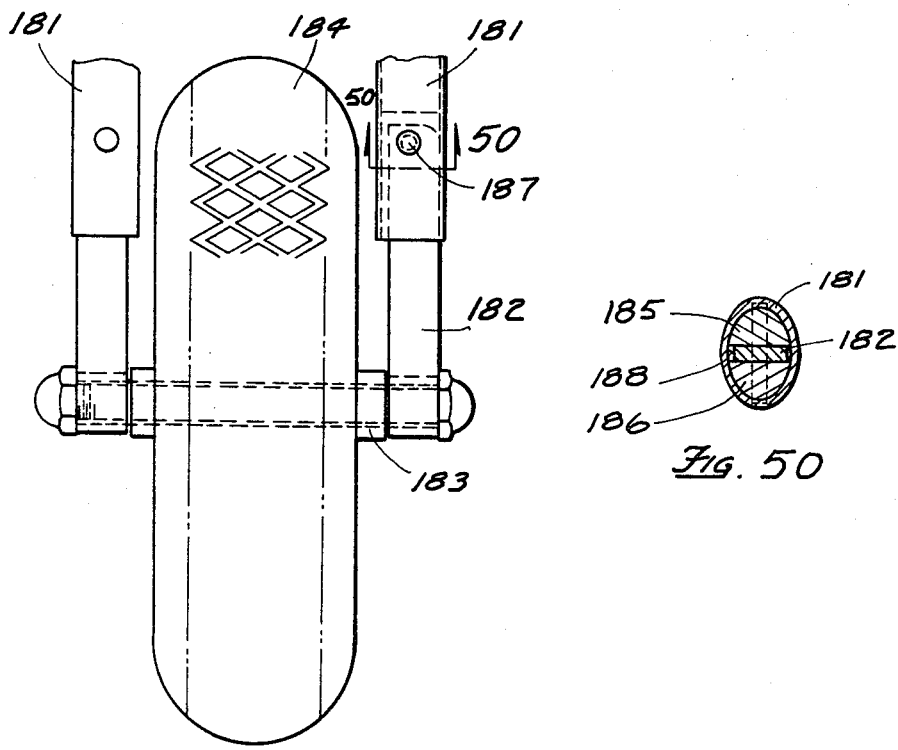

June 25, 1968  E. H. EASTIN  3,389,922
AMUSEMENT AND SPORTING DEVICE
Filed Oct. 22, 1965  14 Sheets-Sheet 14

INVENTOR.
EDWARD H. EASTIN
BY
Barnes, Kisselle, Raisch & Choate
ATTYS.

United States Patent Office 3,389,922
Patented June 25, 1968

3,389,922
AMUSEMENT AND SPORTING DEVICE
Edward H. Eastin, 635 Canyon,
Rochester, Mich. 48063
Filed Oct. 22, 1965, Ser. No. 500,780
36 Claims. (Cl. 280—11.23)

ABSTRACT OF THE DISCLOSURE

The amusement and sporting device disclosed herein comprises a frame which is adapted to support the foot of a user, a single front ground engaging wheel and a single rear ground engaging wheel. Each wheel is mounted on the frame at a point within the circumference of the wheel for rotation about a transverse axis and for swinging movement about a pivotal axis inclined to the vertical and to the axis of rotation of the wheel. The pivotal axis is substantially in the same plane of the wheels when the device is in upright position and the wheels are in alignment.

This invention relates to an amusement and sporting device that is adapted to be ridden by a user.

It is an object of the invention to provide a novel wheeled amusement and sporting device which can support the body and preferably the feet of the wearer to simulate the action of skis and the like on the ground.

It is a further object of the invention to provide an amusement device which is novel in construction and can be made at relatively low cost.

In the drawings:

FIG. 15 is a fragmentary sectional view similar to FIG. 8 of a further modified form of the invention.

FIG. 16 is a fragmentary sectional view taken along the line 16—16 in FIG. 15 showing the parts in a different operative position.

FIG. 17 is a fragmentary sectional view taken along the line 17—17 in FIG. 15.

FIG. 21 is a fragmentary side elevational view of a further modified form of the invention, parts being broken away.

FIG. 22 is a fragmentary sectional view taken along the line 22—22 in FIG. 21.

FIG. 23 is a fragmentary sectional view taken along the line 23—23 in FIG. 21.

FIG. 24 is a fragmentary sectional view taken along the line 24—24 in FIG. 21.

FIG. 25 is a perspective view of one of the parts shown in FIGS. 21 and 22.

FIG. 26 is a fragmentary sectional view similar to FIG. 22 showing a further modified form of the invention.

FIG. 32 is a side elevational view of a further modified form of the amusement device.

FIG. 33 is a fragmentary side elevational view of a portion of the device shown in FIG. 32.

FIG. 34 is a fragmentary sectional view taken along the line 34—34 in FIG. 33.

FIG. 35 is a plan view of a further modified form of the invention.

FIG. 36 is a side elevational view of the form of the invention shown in FIG. 35.

FIG. 37 is a fragmentary sectional view taken along the line 37—37 in FIG. 36.

FIG. 38 is a fragmentary sectional view taken along the line 38—38 in FIG. 35.

FIG. 44 is a side elevational view of a further modified form of the invention.

FIG. 45 is a fragmentary sectional view taken along the line 45—45 in FIG. 44.

FIG. 46 is a fragmentary sectional view taken along the line 46—46 in FIG. 45 showing the parts in a different operative position.

FIG. 47 is a plan elevational view showing a further modified form of the invention.

FIG. 48 is a side elevational view of the device shown in FIG. 47.

FIG. 49 is a fragmentary view taken in the direction of the arrow 49 in FIG. 48.

FIG. 50 is a sectional view taken along the line 50—50 in FIG. 49.

Figure 1:
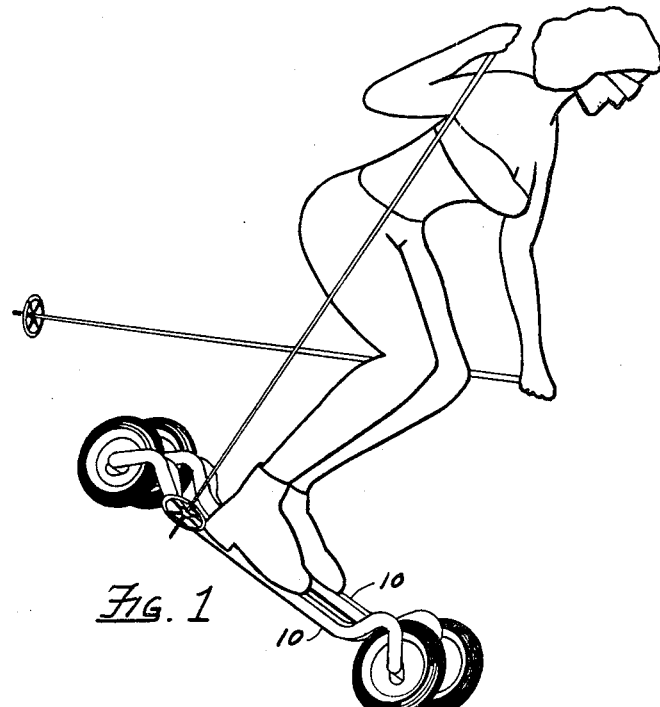
FIG. 1 is a perspective view of an amusement device embodying the invention in use.
Figure 2:
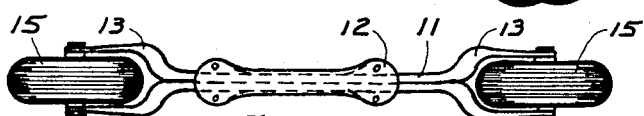
FIG. 2 is a plan view of the amusement device shown in FIG. 1.
Figure 3:
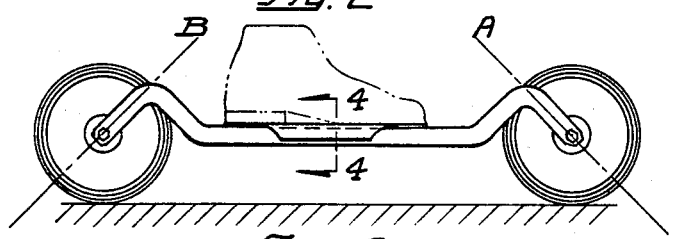
FIG. 3 is an elevational view.
Figure 4:
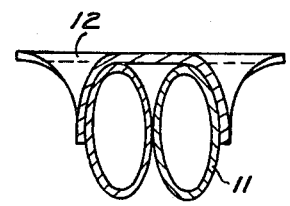
FIG. 4 is a sectional view taken along the line 4—4 in FIG. 3.
Figure 5:
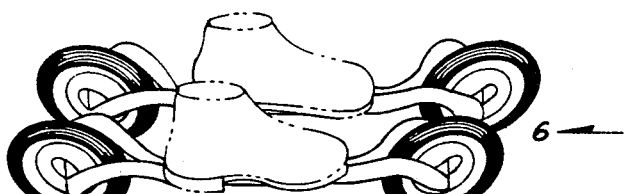
FIG. 5 is a fragmentary plan view showing the manner in which the amusement devices steer automatically under the shifting weight of the rider to simulate skiing action.
Figure 6:
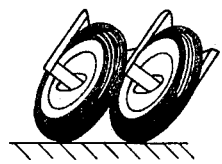
FIG. 6 is a fragmentary front view in the direction of the arrow 6 in FIG. 5.

Referring to FIG. 1, the amusement and sporting device 10 is especially adapted to be mounted and secured on each foot of the user by conventional means to simulate the action of skis. More specifically, as shown in FIGS. 2–6, the device 10 comprises a frame 11 that has a foot support 12 thereon. The frame 11 is made of two tubes (FIG. 4), the ends of which are separated as at 13 to form spaces wherein wheels 15 are mounted. Wheels 15 have treads thereon to minimize lateral slippage. Each wheels is mounted in such a manner that it is free for rotation about a transverse axis and can swing as the weight of the user is applied to steer the device and simulate the action of skis. Thus, as the user is riding down a slope and shifts his weight, for example, to the left with respect to the direction of travel as shown in FIG. 5, wheels 15 at the front and rear turn, the front wheels turning to the left and the rear wheels toward the right (FIGS. 5, 6). This action is achieved by providing a pivotal mount for each wheel about an axis that lies in a vertical plane and is inclined to the vertical. Specifically, as shown in FIG. 3, the front wheel is pivoted about an axis A that is inclined upwardly and rearwardly and the rear wheel is pivoted about an axis B that is inclined upwardly and forwardly. As will appear more clearly hereinafter, yielding means are provided for yieldingly resisting the turning action of the wheels so that when the weight is shifted, each wheel will return to its aligned position with the plane of the wheels 15 intersecting the foot support 12 when the weight is distributed evenly on the support 12 and the support 12 is horizontal. It will be readily understood from the description hereinafter set forth that the pivotal axis about which each wheel is mounted for swinging movement may vary in its inclination to the vertical. Furthermore, limited steering may be achieved by having the front wheel pivoted about an axis which is inclined upwardly and rearwardly and the rear wheel fixed against swinging movement. A different action may be achieved by having the rear wheel pivoted about a vertical axis producing a caster effect.

Figure 7:
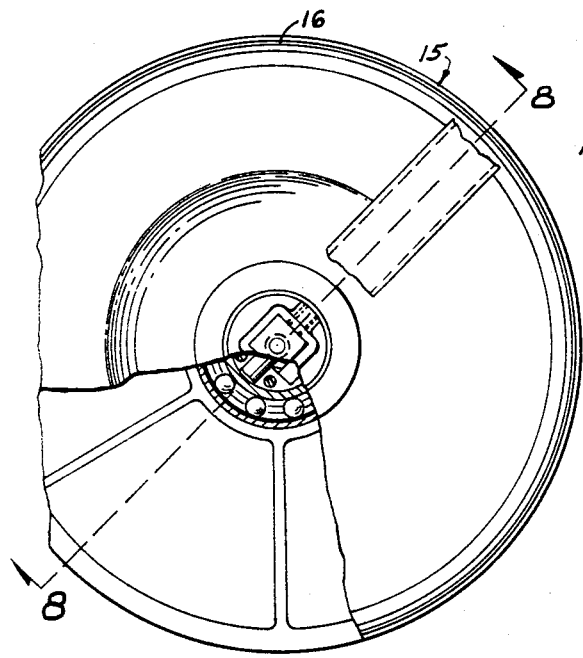
FIG. 7 is a part sectional side view on an enlarged scale showing the rear portion of the device shown in FIG. 3.
Figure 8:
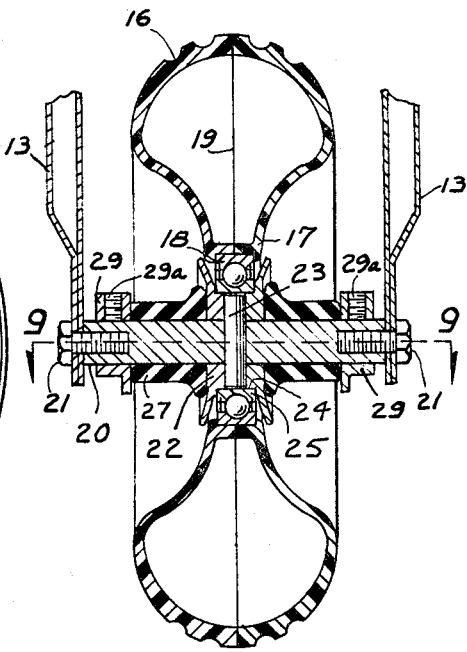
FIG. 8 is a fragmentary sectional view taken along the line 8—8 in FIG. 7 showing the parts in a different operative position.
Figure 9:
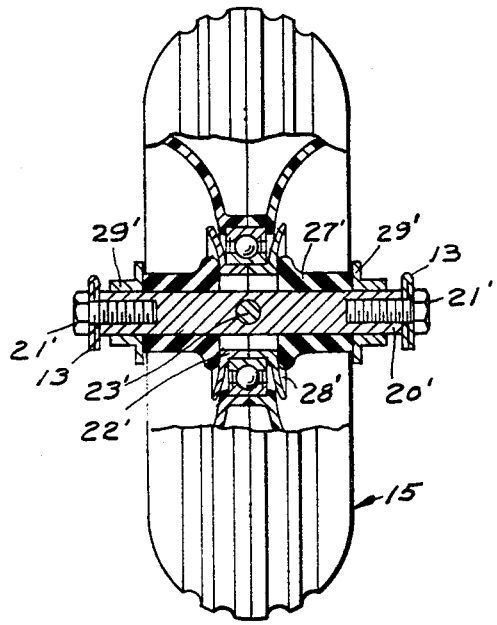
FIG. 9 is a part sectional view taken along the line 9—9 in FIG. 8.

In the form of the invention shown in FIGS. 7–9, each wheel 15 is made of plastic and comprises an integral tire having an outer tread 16 that is curved in cross section and an integral frame that forms an inner seat 17 that engages the outer race 18 of a ball bearing. The wheel 15 can be made of two hollow plastic halves joined along a line 19. An axle in the form of a shaft 20 is secured to the ends 13 of the frame by screws 21 threaded into the shaft. A two piece pivot member 22 is pivoted to the axle 20 by a pivot shaft 23 and forms a seat 24 for the inner race 25 of the ball bearing. In this fashion, the wheel 15 is mounted for rotation about a generally horizontal axis by the bearing on the pivot support 22 and for swinging movement about an axis inclined to the vertical and at an angle to the axis of rotation by the pivot support 22 which is pivoted to the shaft 20 so that the wheel can swing about the axis of the shaft 23. As previously set forth, preferably, the pivotal axis of the shaft 23 extends upwardly and rearwardly on the front wheel and upwardly and forwardly on the rear wheel. The angle which the pivot axis makes can be readily adjusted as presently described with respect to the frame to produce a more or less exaggerated steering in accordance with the desires of the user.

As further shown in FIGS. 3 and 9, blocks 27 of resilient material are telescoped over axle 20 and interposed between the flared sides 28 of the pivot member 22 and a peripheral flange 29 on the axle 20. When the weight of the user is shifted, the engagement of the outer surface 16 of the wheel with the ground will cause the wheel to turn compressing the blocks 27 of resilient material in the manner shown in FIG. 10. When the load distribution is again returned to its original condition, the blocks will return the pivot member 22 and, in turn, the wheel to its original position. By adjusting the position of the flanges 29 on the axle, the precompression of the blocks 27 can be varied to adjust the force which resists the swinging movement of the wheels.

The inclination of the axis of the pivot shaft 23 with respect to the vertical, and in turn the pivotal axis for swinging movement of the wheel 15, may be changed by loosening the screws 21 and rotating the shaft 20. As shown in FIGS. 7 and 8, the shaft 20 is square in cross section so that the set screws 29a which hold the flanges 29 in position readily indicate to an observer the angle of inclination to the pivot shaft 23.

In the form of the invention heretofore described wherein the outer periphery of the tires is transversely curved and in order to obtain best steering results, the pivot axis of the front wheel preferably extends upwardly and rearwardly and the pivot axis of the rear wheel preferably extends upwardly and forwardly. If the outer periphery of the tires were substantially flat, then the pivot axis of the front wheel should preferably extend upwardly and forwardly and the pivot axis of the rear wheel should preferably extend upwardly and rearwardly. It can be appreciated that if the conditions of the terrain require, the outer periphery of the tire may be treated with a coating having higher friction.

Figure 11:
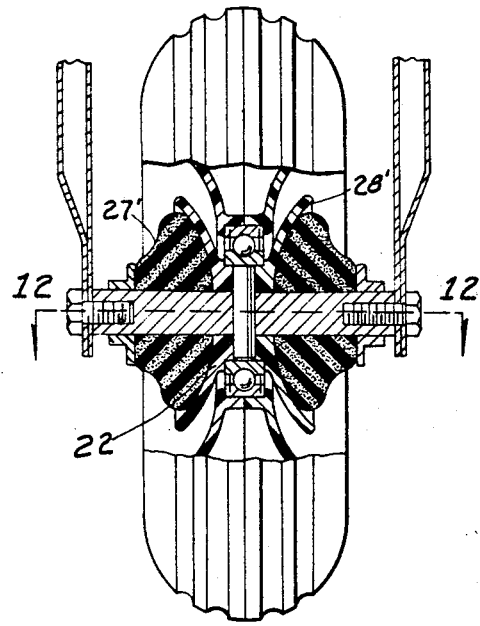
FIG. 11 is a fragmentary sectional view similar to FIG. 8 of a modified form of mounting for the wheel.
Figure 12:
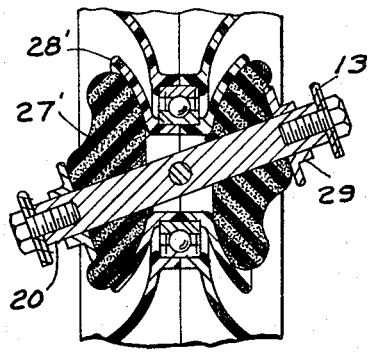
FIG. 12 is a fragmentary sectional view taken along the line 12—12 in FIG. 11 showing the parts in a different operative position.

In the form of the invention shown in FIGS. 11 and 12, the blocks 27' of resilient material are made of foam rubber so that a softer more resilient action is achieved. To accommodate the larger blocks of material required, the flared flanges 28' of the pivot member 22' extend radially outwardly a greater distance. In addition, two piece pivot member 22 is made of molded plastic.

Figure 10:
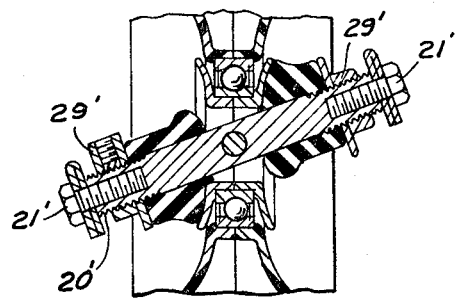
FIG. 10 is a fragmentary view similar to FIG. 9 showing the parts in a different operative position.

In the form of the invention shown in FIGS. 9 and 10, the axle 20' is circular in cross section and the flanges 29' are threaded onto the axle. The angle of inclination of the pivot shaft 23' can be readily changed by loosening the screws 21' and rotating the shaft 20'.

Figure 13:
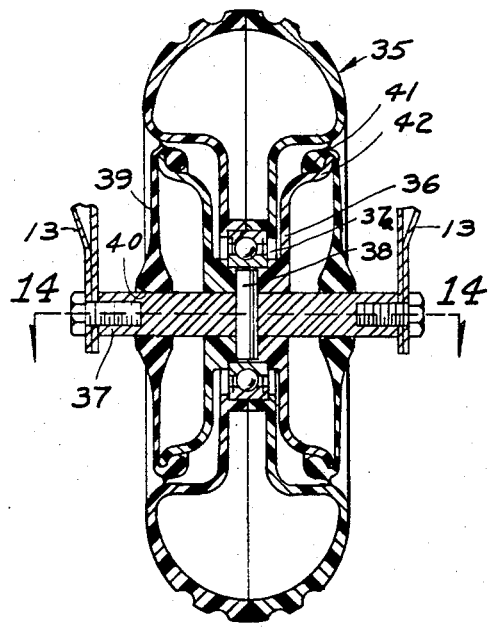
FIG. 13 is a fragmentary sectional view similar to FIG. 8 of another modified form of the invention.
Figure 14:
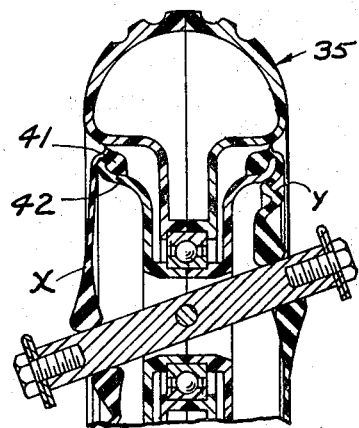
FIG. 14 is a fragmentary sectional view taken along the line 14—14 in FIG. 13 showing the parts in a different operative position.

In the form of the invention shown in FIGS. 13 and 14, the wheel 35 is rotatably mounted on a pivot member 36 by a ball bearing 37a and the pivot member 36 is pivoted to the axle 37 by a pivot shaft 38 in the manner of the previous forms of the invention. The axle 37 is, in turn, mounted on the extensions 13 of the frame. In this form of the invention, the yielding resistance to swinging movement of the wheel 35 is achieved by elastic corrugated diaphragms 39 that have openings 40 therein through which the axle 37 extends and peripheral beads 41 at their periphery which are stretched over to the extensions 42 on the pivot member 36. The diaphragms are stretched into position over the periphery of extensions 42. As the load is shifted in this form of the invention, the wheel will turn and place portions x of the diaphragms 39 under greater tension while the tension on other portions y is reduced as shown in FIG. 14.

In the form of the invention shown in FIGS. 15–17, the wheel 45 comprises a semi-pneumatic tire 46 mounted on a wheel frame 47 that, in turn, is supported on pivot member 48 by a ball bearing 49. The pivot member 48 is pivoted to the axle 50 by a pivot shaft 51 that extends through the axle. Projections 53 fixed between the halves of the pivot member extend upwardly into opening 50a in axle 50. Projections 54 in the form of keys on the axle extend radially inwardly into opening 50a in axle 50. Four blocks of resilient material such as rubber 52 are positioned in opening 50a between the projections 53, 54. In this fashion, as the wheel swings under the shifting load from its normal position, the projections 53, 54 move relative to one another to place portions of the block under compression and yieldingly resist the swinging movement of the wheel away from its normal position.

Figure 18:
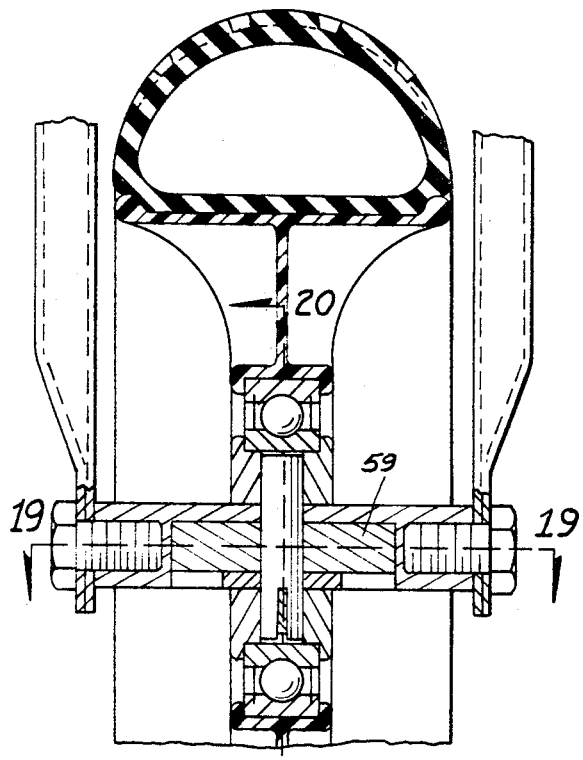
FIG. 18 is a fragmentary sectional view similar to FIG. 8 of a further modified form of the invention.
Figure 19:
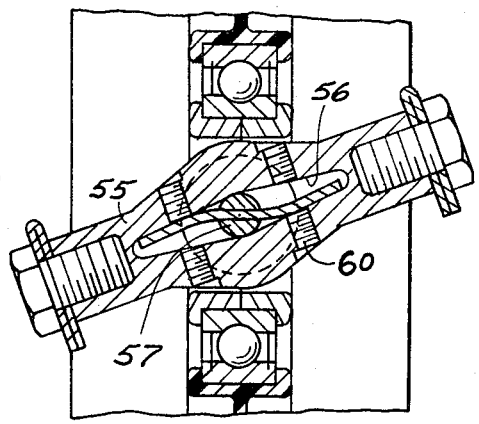
FIG. 19 is a fragmentary sectional view taken along the line 19—19 in FIG. 18 showing the parts in a different operative position.
Figure 20:
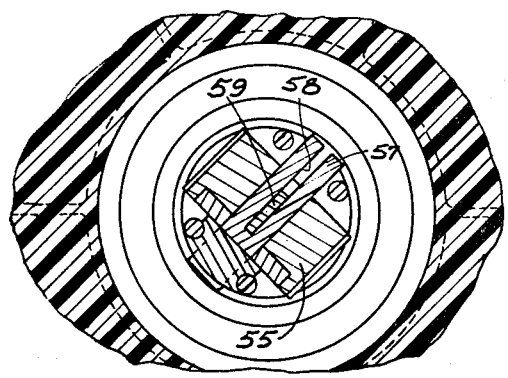
FIG. 20 is a sectional view taken along the line 20—20 in FIG. 18.
Figure 27:
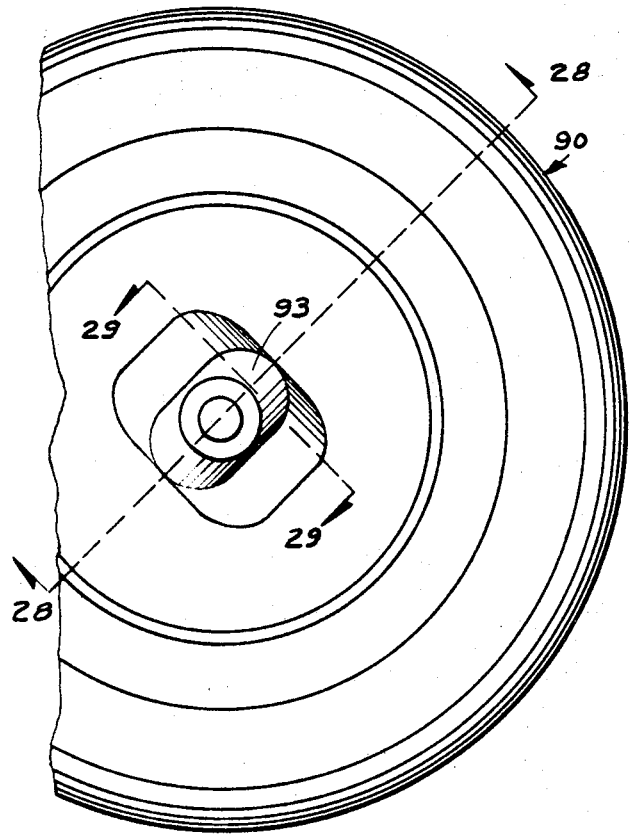
FIG. 27 is a fragmentary side elevational view of a further modified form of the invention.
Figure 28:
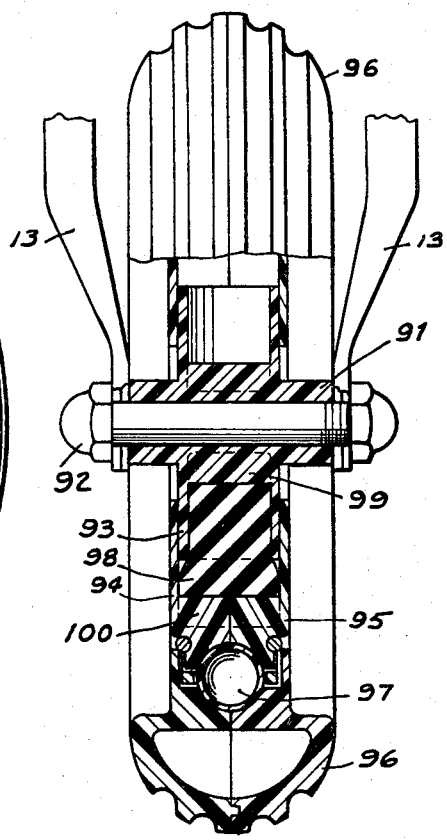
FIG. 28 is a fragmentary part sectional view taken along the line 28—28 in FIG. 27.
Figure 29:
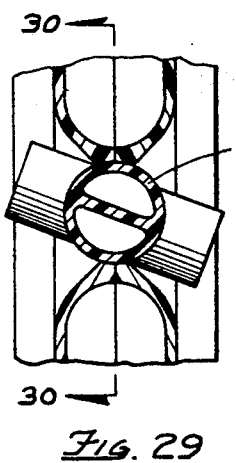
FIG. 29 is a fragmentary sectional view taken along the line 29—29 in FIG. 27.
Figure 30:
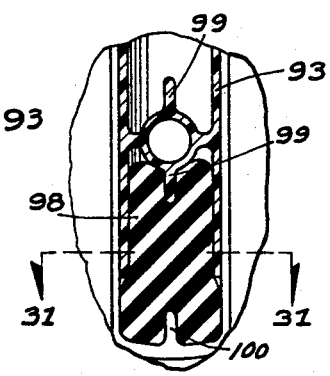
FIG. 30 is a fragmentary sectional view taken along the line 30—30 in FIG. 29.
Figure 31:
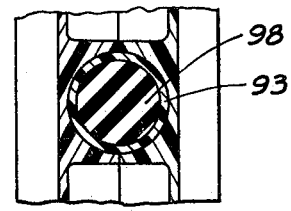
FIG. 31 is a fragmentary sectional view taken along the line 31—31 in FIG. 30.
Figure 39:
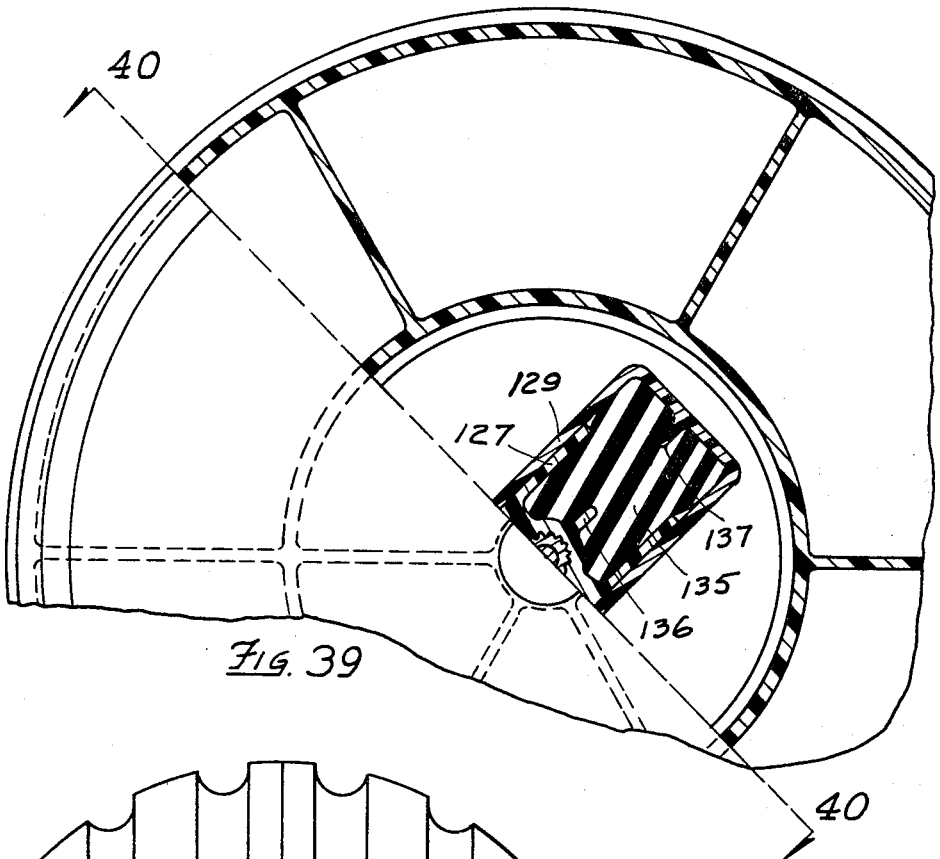
FIG. 39 is a part sectional view taken along the line 39—39 in FIG. 37.

In the form of the invention shown in FIGS. 18–20, the wheel is constructed in a manner similar to that shown in FIGS. 15–17, but the yielding resistance to swinging movement of the wheel is obtained by a construction wherein the axle 55 is provided with an axial opening 56 and the pivot shaft 57 has a slot 58 through which a flat spring steel member 59 extends. The plane of spring member 59 extends at the angle of the shaft 57 and along the axis of the axle 55. Adjusting screws 60 engage opposite sides of spring member 59 at its ends. As shown in FIG. 19, as the wheel swings, the spring member 59 assume a sinuous curvature which yieldingly resists the swinging movement of the wheel and returns the wheel to its original position when the load is removed.

In the form of the invention shown in FIGS. 21–25, the wheel 65 includes a combined tire and wheel frame made of sections 66, 67 that are molded of plastic and have a curved outer surface and are formed with an integral outer race 68 for a ball bearing 69. The wheel also includes a wheel frame 70 that is formed of plastic and has a race 71. An O-ring 71a forms a dirt seal. In this form of the invention, the molded plastic axle member 72 has a hollow cavity 81 and includes threaded bushings 73 into which screws can be threaded to mount the axle on the legs 13 of the frame. A pivot shaft 74 has one end thereof rotatably mounted in a seat 75 in the axle and the other end thereof engaging a seat 76 of a pivot member 77. The pivot shaft 74 includes a curved upper portion 72a that engages a complementary seat 72b on the wheel 70. As shown in FIG. 22, the pivot member 77 has a curved lower portion 78 that engages a complementary seat 79 formed integrally in the wheel 70 and a generally circular upper portion 80 that telescopes within a cavity 81 in the axle member 72. A block 82 of resilient material such as rubber is provided in the cavity 81 around the shaft 74. The upper end of the block 82 is interconnected to the axle member 72 by integral projections 83 on the axle member 72 that extend into grooves in the block 82. The lower end of the block 82 is connected to the pivot member 77 by radially extending projections 84 that extend into slots in the lower end of the block. As the wheels 65 tend to turn due to the shifting of loads, the block 82 is placed under torsion opposing the movement of the wheel. At the same time, the block 82 in all positions of the wheel absorbs some of the shock of loads placed upon the wheel.

In assembling the form of the invention shown in FIGS. 21–25, axle member 72, block 82 and pivot member 77 are first assembled. The assembly is then compressed to permit the curved portion 72a of the pivot shaft 74 to engage the seat 72b and the curved portion 78 of the pivot member 77 to engage the seat 79. When the compression of the assembly is relieved, the block 82 holds the axle member 72 and the pivot member 77 in position.

As in the previous forms of the invention, the axis of the pivot shaft 74 preferably extends upwardly and rearwardly on the front wheel and upwardly and forwardly on the rear wheel.

In use, the weight of the user affects the resistance to swinging movement which is presented by the block 82. Specifically, if the weight of the user is greater, the block 82 is precompressed resulting in a greater torsion force opposing the swinging movement of each wheel. Furthermore, the inclusion of the block 82 provides for an "upweighting" action similar to that of skis so that as the user upweights his body, the compression of the blocks 82 is momentarily relieved permitting the wheels to swing more readily as the weight is shifted to produce a turning movement. The resistance to swing movement is thus proportional to the load on the wheels.

In the form of the invention shown in FIG. 26, the tire 65′ is made of slightly different construction and includes solid halves 85 that form the outer bearing race 85a. In addition, a metal liner 86 provides a hardened bearing surface on the inner race 71′ of the ball bearing.

In the form of the invention shown in FIGS. 27–31, the wheel 90, which has a tire similar in construction to that shown in FIGS. 21–25, is mounted for rotation and swinging movement by an arrangement which includes an axle 91 that is fastened between the arms 13 by a cross bolt 92. The axle 91 includes integral tubular projections 93 that are telescoped into complementary tubular projections 94 on the wheel frame 95. The tire 96 is, in turn, rotatably mounted on the wheel frame by a ball bearing 97. A block 98 of resilient material such as rubber is interposed in the hollow lower projection 93 and is connected to the axle member 91 by a flange 99 that extends radially into a groove in the block 98 and is connected to the wheel frame 95 by another flange 100 that extends radially into a groove in the wheel block so that any tendency of the wheel 90 to swing about the axis of the projections 93 is resisted by torsional stressing of the block 98. Also in this form, the resilient block tends to absorb shock of loads.

In the form of the invention shown in FIGS. 32–34, the pivot axes C, D of the wheel are offset forwardly and do not intersect the axis of rotation of the wheel. Specifically, the wheel 110 includes a tire 111 that is rotatably mounted on a wheel frame by ball bearings in the manner shown in FIGS. 21–25. The frame 112 is mounted for swinging movement on an axle 113 supported between the arms 13 of the frame. In all other respects, the construction shown in FIGS. 32–34 is substantially the same as shown in FIGS. 21–25 except that the axis of the pivot shaft does not intersect the axis of the axle.

In the form of the invention shown in FIGS. 35–40, the wheel frame extends only to one side of the wheels permitting the feet of the user to be brought closer together.

Figure 40:
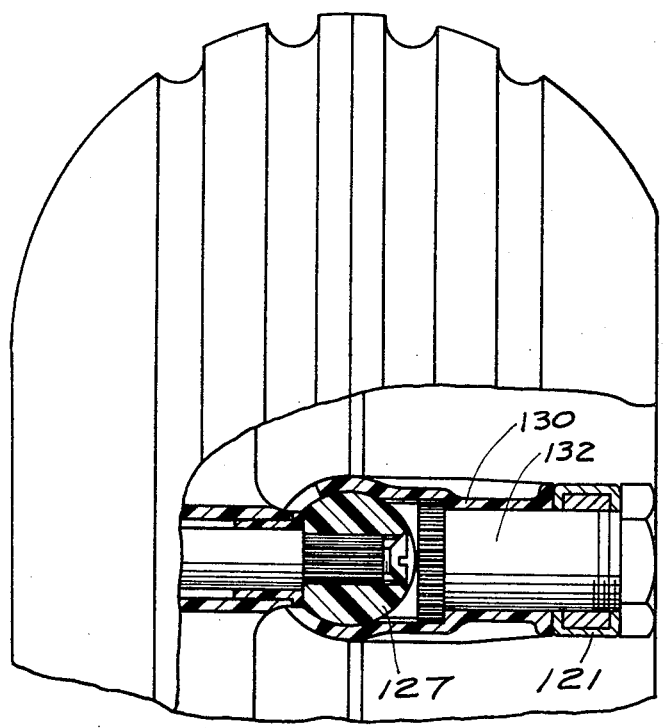
FIG. 40 is a part sectional view taken along the line 40—40 in FIG. 39.

Referring specifically to FIGS. 35–40, the frame 120 has curved end portions 121 that extend to one side of wheels 122. The wheels 122 have curved outer peripheries 123 and are preferably molded of two plastic halves, one of which defines an inner wheel frame 124 into which flanged bushings 124a, 124b are pressed and through which an axle 125 extends. The axle 125 is fixed on a pivot member 127 that is journalled in tubular projections 128, 129 of a tubular member 130 that is fixed on the end 121 of the frame. Specifically, the axle 125 is mounted on the pivot member 127 by a screw 131, the head of which engages a tapered seal in the pivot member 127. A flanged tubular member 132 is seated in a tubular extension 130 with the flange 132a engaging a seat 132b. A nut 140 is threaded on the end of member 132 to clamp the support 130 on the arm 121. A block 135 of resilient material such as rubber is interposed between the upper projection 129 of the tubular member 130 and the pivot support 127 and is interlocked therebetween by flanges 136, 137 on the pivot support 127 and projection 129, respectively, which extend into grooves in the block 135. Thus, the pivot shaft 127 is mounted for swinging or pivotal movement on the frame 120 and the axle 125 is, in turn, fixed on the pivot shaft 127. In order to assemble the structure, the tubular member 132 is placed in the tubular member 130. Block 135 is then positioned in projection 129 and the pivot member 127 is inserted in the projections 128, 129. The block 135 is compressed by moving the pivot member 127 upwardly to permit the axle 125 with the wheel mounted thereon to be inserted into the opening 127a extending transversely into the pivot member 127. Finally, nut 140 is threaded on the tubular extension 132. A spacer 141 is preferably provided in the end of the arm 121. As shown in FIG. 40, the interengaging surfaces of the axle and the opening are serrated to hold the axle against rotation.

Figure 41:
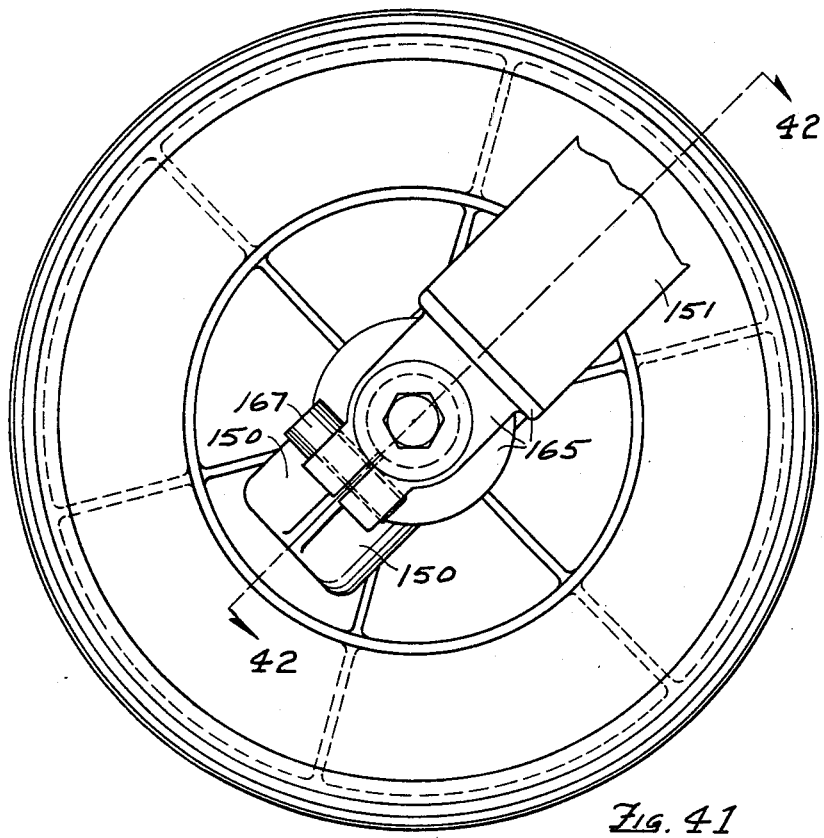
FIG. 41 is a fragmentary side elevational view of a further modified form of the invention.
Figures 42, 43:
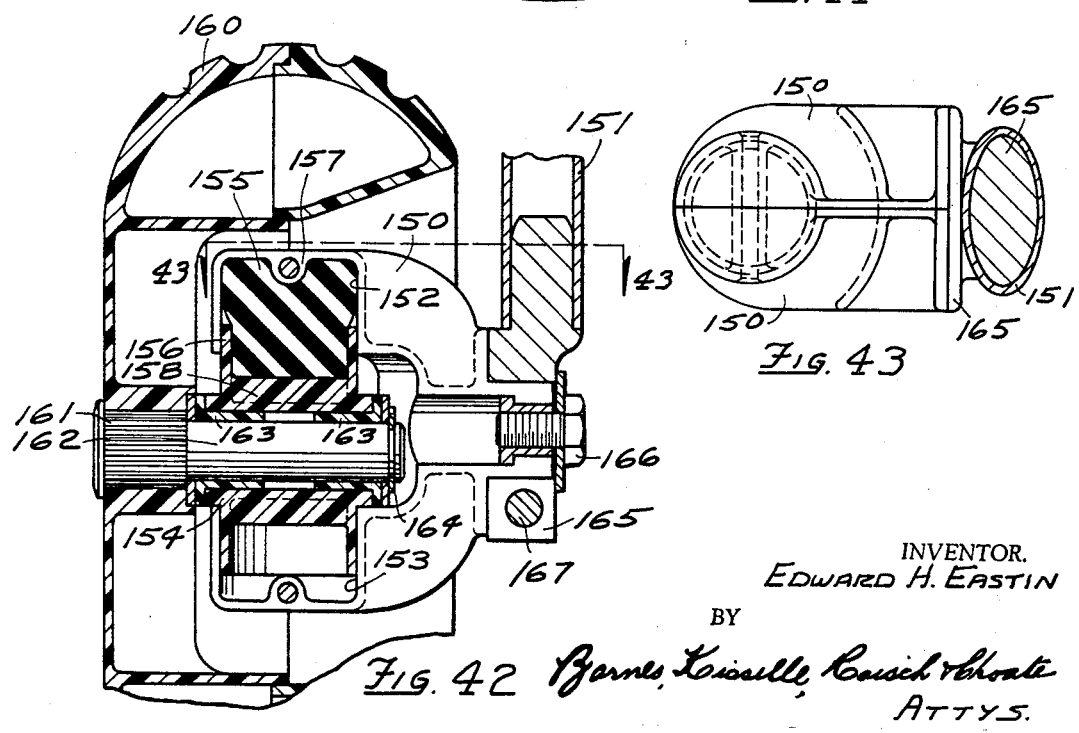
FIG. 42 is a fragmentary sectional view taken along the line 42—42 in FIG. 41.
FIG. 43 is a fragmentary sectional view taken along the line 43—43 in FIG. 42.

In the form of the invention shown in FIGS. 41–43, a two-piece pivot yoke 150 is fixed on the end of each frame extension 151 and includes opposed tubular seats 152, 153 into which the projections of a pivot member 154 extend so that the pivot member is pivoted for swinging movement about an inclined axis. A block 155 of resilient material such as rubber is interposed between the upper projection 156 of the pivot member 154 and the seat 152. As in the previously described forms of the invention of this type, opposed flanges 157, 158 extend into grooves in the block 155 so that the block is placed under torsion as the pivot member 154 swings. The wheel 160 has an axle 161 press fitted thereon. The axle 161 in turn includes an extension 162 that is journalled within the pivot member 154 by bearings 163. A lock ring 164 maintains the axle in position. In assembly, the pivot yoke 150, block 155 and pivot member 154 are first assembled and then the wheel with the axle thereon is assembled within the pivot member 154. Finally, the yoke 150 is mounted in a split mounting block 165 which is fixed to the lower end of the extension 151 by a nut and bolt assembly 166. Screw 167 is then tightened to clamp the two halves of yoke 150 in position. By loosening screw 167, the angle of the pivot axis can be changed.

In the form of the invention shown in FIGS. 44–46, the wheels 170 are mounted on the frame 171 for rotation about a transverse axis and for swinging movement about inclined axes by a construction which includes extensions 172 on the ends of the frame that extend downwardly and forwardly at the front and downwardly and rearwardly at the rear at the angle about which the permissible swinging movement of the wheels is desired. Each wheel 170 includes a solid tire 173 that is mounted for rotation by a ball bearing 174 on an annular wheel frame 175. A semirigid disc 176 is positioned on the interior of the wheel frame 175 and is held in position by an annular flange 177 extending into a groove 178 in the periphery of disc 176. A plate 179 extends along a portion of the extension 172 and rivets 179a fasten the disc 176 to the extension 172. The wheels are thus free to rotate about a transverse axis and have limited swinging movement about an axis parallel to the extension 172 as shown in FIG. 46.

A further modified form of the invention is shown in FIGS. 47–50. Specifically, frame 180 includes bifurcated extensions 181 at the front and rear which extend downwardly and forwardly at the front and downwardly and rearwardly at the rear along axes substantially parallel to the axis about which it is desired to swing the wheels. Flat flexible spring members 182 are secured in the ends of the extensions 181 and are connected to the axle 183 about which the wheel 184 is mounted for rotation about conventional bearings. Specifically, the upper end of each spring member 182 extends between inserts 185, 186 in the corresponding extension 181 and is held therein by a rivet 187. As shown in FIG. 50, the slot 188 into which the end of the spring member extends is wider than the width of the spring member to permit some lateral shifting of the spring members inwardly. The outer edges of the spring member engage the sides of the extensions 181.

Figure 51:
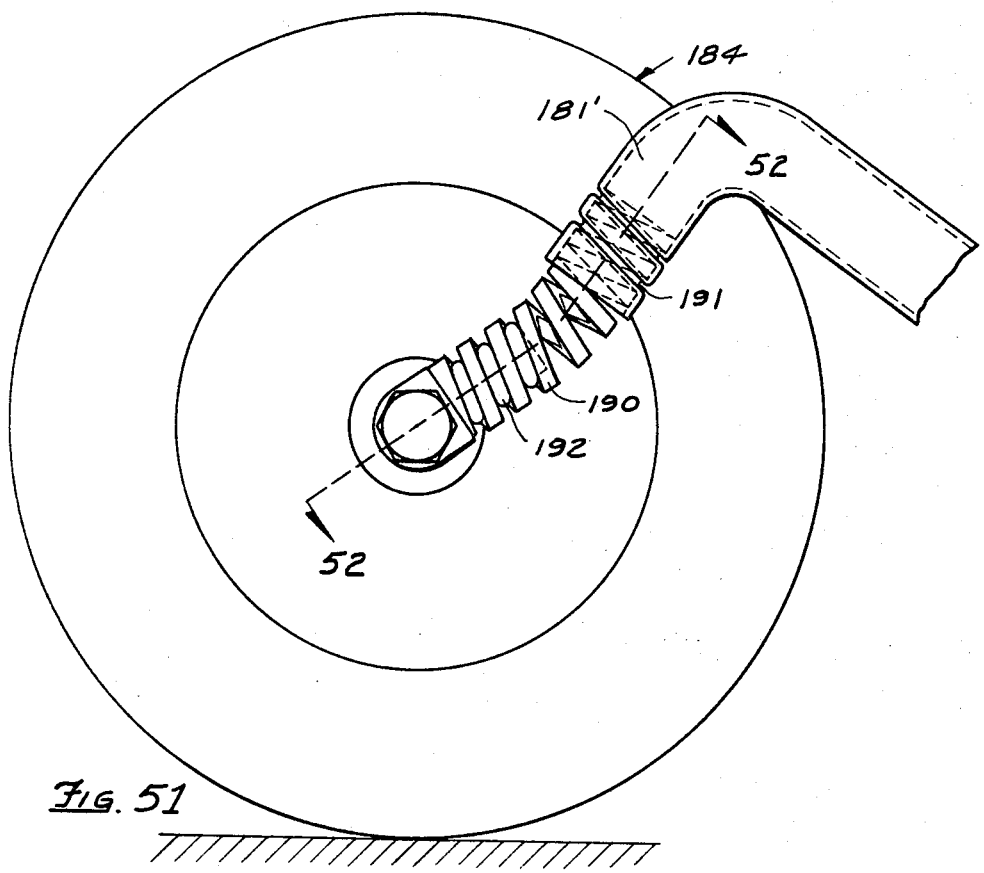
FIG. 51 is a fragmentary side elevational view of a further modified form of the invention.
Figure 52:
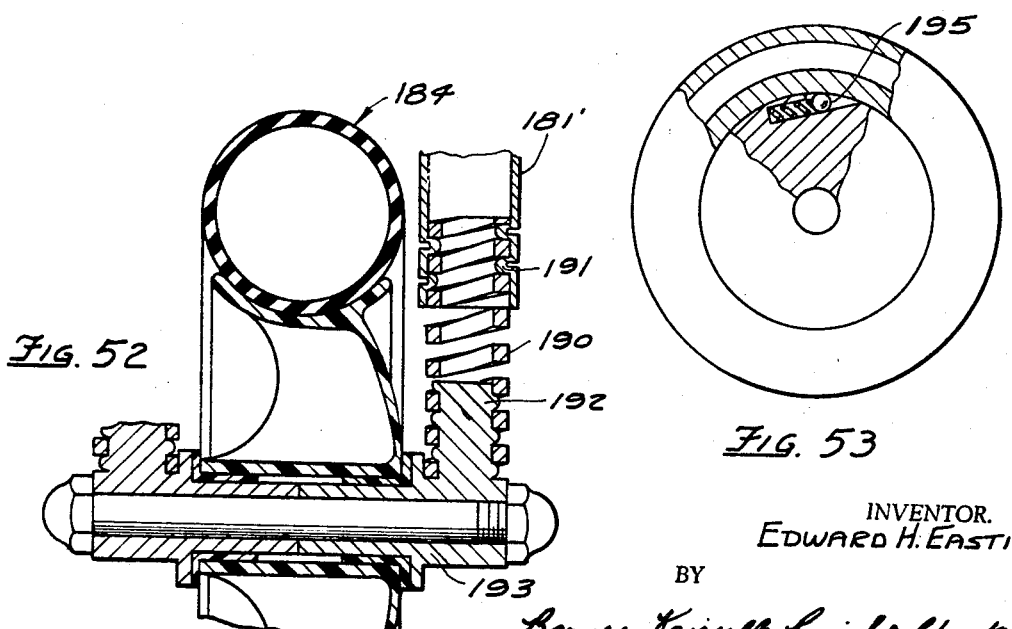
FIG. 52 is a fragmentary part sectional view taken along the line 52—52 in FIG. 51.

A further modified form of the invention is shown in FIGS. 51 and 52 wherein the extensions 181' are connected to the wheel 184 by stiff helical metal springs 190 that are threaded into threads 191 in the extensions 181' at one end and onto threaded projections 192 on halves of axle member 193 at the other end.

In both forms of the invention shown in FIGS. 47–50 and FIGS. 51 and 52, the lateral shifting of the load on the frame causes the wheels to swing about a generally inclined axis between the spring members and produce the desired swinging motion of the device.

Figure 53:
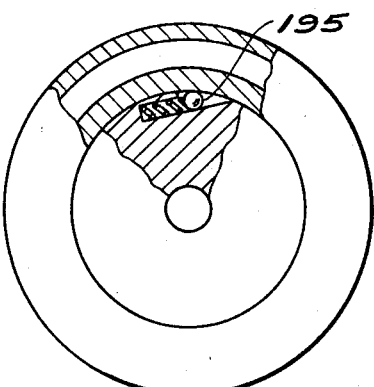
FIG. 53 is a fragmentary part sectional view of a further modified form of the invention.

In each of the forms of the invention heretofore described, the wheels may be provided with a one-way clutch 195 as shown in FIG. 53 to prevent rearward rotation of the wheels.

I claim:
1. An amusement and sporting device comprising
    a frame adapted to support a user,
    a single front ground engaging wheel,
    a single rear ground engaging wheel,
    means individual to each said wheel within the circumference of said wheel for mounting the wheel on the frame for rotation about a transverse axis and for swinging movement about a pivotal axis inclined to the vertical and to the axis of the rotation of the wheel, said pivotal axis being substantially in the plane of the wheels when the device is in upright position and the wheels are in alignment.
2. The combination set forth in claim 1 including means yieldingly resisting the swinging movement about said pivotal axis.
3. The combination set forth in claim 2 wherein each wheel has a transversely curved ground engaging surface and the pivotal axis of the front wheel extends upwardly and rearwardly and the pivotal axis of the rear wheel extends upwardly and forwardly.
4. The combination set forth in claim 2 wherein each wheel has a substantially flat ground engaging surface and the pivotal axis of the front wheel extends upwardly and forwardly and the pivotal axis of the rear wheel extends upwardly and rearwardly.
5. The combination set forth in claim 1 wherein said frame extends to the rotational axis of the wheels from one side of the wheels only.
6. The combination set forth in claim 1 wherein each said wheeled supporting means includes means for changing the angle of the pivotal axis to the vertical.
7. The combination set forth in claim 1 including a one-way clutch associated with each said wheel preventing rearward rotation of said wheel.
8. The combination set forth in claim 1 wherein said pivotal axis intersects the axis of rotation.
9. The combination set forth in claim 1 wherein said pivotal axis is offset and does not intersect the axis of rotation.
10. An amusement and sporting device adapted to be mounted on each foot of a user comprising
    a frame adapted to support a user,
    a single front ground engaging wheel,
    a single rear ground engaging wheel,
    means within the circumference of at least one of said wheels for mounting said wheel on the frame for rotation and for swinging movement about a pivotal axis inclined to the vertical and to the axis of the rotation of the wheel,
    said pivotal axis being substantially in the plane of the wheels when the device is in upright position and the wheels are in alignment,
    and means yieldingly resisting the swinging movement about said pivotal axis.
11. The combination set forth in claim 10 wherein said last-mentioned means comprises blocks of rubber interposed between said pivotal means and said axle and adapted to be compressed to resist swinging movement of said wheel relative to its respective axle.
12. The combination set forth in claim 10 wherein said last-mentioned means comprises elastic diaphragms extending between the axle on each side of said pivotal means and the wheel whereby when the wheel tends to swing about said pivotal axis, said diaphragms are placed under tension.
13. The combination set forth in claim 10 wherein said pivotal means comprises a pivot shaft, said last-mentioned means comprising elastic means surrounding said pivot shaft,
    and rigid means on one of said pivot shaft and said axle and movable therewith for compressing said elastic means to yieldingly resist swinging movement of the wheel.
14. The combination set forth in claim 10 wherein said pivotal means comprises a pivot shaft, said last-mentioned means comprising a spring member extending through said pivot shaft, means interconnecting the ends of said spring member and said axle.

15. The combination set forth in claim 14 including means for varying the force on said spring member.

16. The combination set forth in claim 10 wherein said pivotal means comprises a pivot shaft, said last-mentioned means comprising an axle member having a hollow central portion,
    said pivotal means adapted to telescope within said central portion of said axle member with one end of said pivot shaft in said pivotal means and the other end of said pivot shaft in said axle member,
    a block of resilient material surrounding said shaft and filling said cavity,
    and means interconnecting said block of resilient material and said axle and said pivot block and said block of resilient material whereby said block is placed under torsion to resist swinging movement of the wheel about said pivotal axis.

17. The combination set forth in claim 10 wherein said pivotal means comprises a pivot shaft, said last-mentioned means including a construction wherein said axle and said pivot shaft are made integral with the pivot shaft comprising projections extending at a generally right angle from said axle,
    said pivotal means including complementary means in which said projections that form the pivot shaft extend,
    and a block of resilient material interposed within at least one of said projections and connected to said projection and said complementary means of said pivotal means.

18. An amusement and sporting device comprising
    a frame having supporting means thereon for the user,
    a single front ground engaging wheel,
    a single rear ground engaging wheel,
    means for mounting each said wheel on said frame comprising an axle mounted directly on said frame,
    a pivot shaft,
    means pivoting said shaft on said axle within the circumference of said wheel about an axis inclined to the vertical and forming an angle with the axle,
    the axis of said pivot shaft being substantially in the plane of its respective wheel,
    means forming a bearing between said last-mentioned means and said respective wheel whereby the wheel can rotate about the axis of the axle and swing about the axis of said shaft,
    and means yieldingly resisting the swinging movement of each said wheel.

19. The combination set forth in claim 18 wherein said bearing lies in a cylinder which circumscribes said pivot shaft.

20. The combination set forth in claim 19 wherein said pivot shaft and said bearing lie in substantially the same plane.

21. The combination set forth in claim 18 wherein the axis of said pivot shaft and said axle intersect.

22. The combination set forth in claim 18 wherein said last-mentioned means comprises elastic material interposed between said pivotal means and said axle and adapted to be compressed to resist swinging movement of said wheel relative to its respective axle.

23. The combination set forth in claim 18 wherein said last-mentioned means comprises elastic diaphragms extending between the axle on each side of said pivot means and the wheel whereby when the wheel tends to swing about said pivotal axis, said diaphragms are placed under tension.

24. The combination set forth in claim 18 wherein said last-mentioned means comprises elastic means surrounding said pivot shaft,
    and rigid means on each of said pivot shaft and said axle and movable therewith for compressing said elastic means to yieldingly resist swinging movement of the wheel.

25. The combination set forth in claim 18 wherein said last-mentioned means comprises a spring member connected to said pivot shaft intermediate its ends,
    means interconnecting the ends of said spring member and said axle.

26. An amusement and sporting device comprising
    a frame having supporting means thereon,
    a single front ground engaging wheel,
    a single rear ground engaging wheel,
    means for supporting at least one said wheel on said frame comprising
    an axle,
    means within the circumference of the wheel for mounting said axle on said frame for swinging movement about a pivotal axis inclined to the vertical,
    said pivotal axis being substantially in the plane of the wheels when the device is in upright position and the wheels are in alignment,
    and means for mounting said wheel on said axle,
    and means yieldingly resisting the swinging movement of said axle and in turn said wheel about said pivotal axis.

27. The combination set forth in claim 26 wherein said last-mentioned means comprises a pivot shaft fixed on said axle and having laterally extending projections,
    said frame having complementary seats in which said pivot shaft is journalled,
    and yielding means between said pivot shaft and said frame for yieldingly resisting said swinging movement.

28. The combination set forth in claim 27 wherein said yielding means comprises a block of resilient material secured to said pivot shaft and said frame for yieldingly resisting the swinging movement under torsion.

29. The combination set forth in claim 27 wherein said axle forms an integral part of said wheel.

30. The combination set forth in claim 26 including means for adjusting the angular position of said pivot axis relative to said frame.

31. The combination set forth in claim 26 wherein said frame extends to one side only of said wheel.

32. An amusement and sporting device adapted to be attached to the feet of a user comprising
    a frame having supporting means thereon,
    a single front ground engaging wheel,
    a single rear ground engaging wheel,
    and means for mounting each said wheel on the frame for rotation and for swinging movement about a pivot axis forming an angle with the vertical which comprises
    a bearing rotatably supporting said wheel,
    a resilient member mounted within said bearing,
    and means for connecting said frame to said resilient member with the frame extending at the aforementioned angle to the vertical, said pivotal axis being substantially in the plane of the wheels when the device is in upright position and the wheels are in alignment.

33. An amusement and sporting device comprising
    a frame having supporting means thereon for a user,
    a single front ground engaging wheel,
    a single rear ground engaging wheel,
    means for mounting at least one said wheel on said frame comprising an axle mounted directly on said frame,
    means pivoting a shaft on said axle about an axis inclined to the vertical and forming an angle with the axle,
    said shaft lying substantially within the confines of said wheel,
    said pivotal axis being substantially in the plane of the wheels when the device is in upright position and the wheels are in alignment, means forming a bearing between said last-mentioned means and said respective wheel whereby the wheel can rotate about the axis of the axle and swing about the axis of said shaft, and means yieldingly resisting the swinging movement of each said wheel.

34. An amusement and supporting device comprising a frame having supporting means thereon for the user, a front ground engaging wheel, a rear ground engaging wheel, means for mounting each said wheel on said frame comprising an axle mounted directly on said frame, a pivot shaft, means pivoting said shaft on said axle about an axis inclined to the vertical and forming an angle with the axle, means forming a bearing between said last-mentioned means and said respective wheel whereby the wheel can rotate about the axis of the axle and swing about the axis of said shaft, and means yieldingly resisting the swinging movement of each said wheel, said last-mentioned means including a construction wherein said axle and said pivot shaft are made integral with the pivot shaft comprising projections extending at a generally right angle from said axle, said pivot means including complementary means in which said projections that form the pivot shaft extend, and a block of resilient material interposed within at least one of said projections and connected to said projection and said telescoping pivot portion of said pivot means.

35. An amusement and supporting device comprising a frame having supporting means thereon for the user, a front ground engaging wheel, a rear ground engaging wheel, means for mounting each said wheel on said frame comprising an axle mounted directly on said frame, a pivot shaft, means pivoting said shaft on said axle about an axis inclined to the vertical and forming an angle with the axle, means forming a bearing between said last-mentioned means and said respective wheel whereby the wheel can rotate about the axis of the axle and swing about the axis of said shaft, and means yieldingly resisting the swinging movement of each said wheel, said last-mentioned means comprising a block of resilient material, said pivoting means comprising a pivot member, said axle and said pivot member having complementary recesses for receiving said block of resilient material such that the block is placed in compression when the device is in use, interengaging means on said pivot member and said axle for connecting the block thereto such that the block is placed in torsion resisting swinging movement of the wheel about the pivot axis.

36. The combination set forth in claim 35 wherein only one of the ground engaging wheels is mounted for pivotal movement.

References Cited

UNITED STATES PATENTS

| | | | |
|---|---|---|---|
| 235,666 | 12/1880 | Barney | 280—11.19 |
| 332,278 | 12/1885 | Nelson et al. | 280—11.23 |
| 628,433 | 7/1899 | Finch. | |
| 864,334 | 8/1907 | Pilz | 280—11.21 |
| 1,150,227 | 8/1915 | Ries | 280—11.23 XR |
| 1,157,049 | 10/1915 | Schultz | 280—11.23 |
| 2,259,346 | 10/1941 | Long | 280—11.23 |
| 2,449,871 | 9/1948 | Bohlen | 280—11.11 |
| 2,552,035 | 5/1951 | Cooke et al. | 280—11.28 |
| 2,763,490 | 9/1956 | Crone | 280—11.28 |
| 2,868,554 | 1/1959 | Ring | 280—11.23 XR |

FOREIGN PATENTS

| | | |
|---|---|---|
| 108,714 | 1/1928 | Austria. |
| 4,783 | 1876 | Great Britain. |

LEO FRIAGLIA, *Primary Examiner.*

MILTON L. SMITH, *Examiner.*